United States Patent [19]

Simpson

[11] 3,853,891

[45] Dec. 10, 1974

[54] N-(N-(CYANOALKYL)-N-NITROSO)AMINO-AMINOALCOHOL

[75] Inventor: William R. Simpson, Mendham, N.J.

[73] Assignee: Sandoz-Wander, Inc., Hanover, N.J.

[22] Filed: June 20, 1973

[21] Appl. No.: 371,932

Related U.S. Application Data

[60] Division of Ser. No. 153,883, June 16, 1971, Pat. No. 3,766,185, which is a continuation-in-part of Ser. No. 131,431, April 5, 1971, abandoned, which is a continuation-in-part of Ser. Nos. 51,338, June 30, 1970, abandoned, and Ser. No. 67,994, Aug. 28, 1970, abandoned.

[52] U.S. Cl.... 260/293.87, 260/239 B, 260/326.85, 260/465.4, 260/465.5 R
[51] Int. Cl............................................. C07d 29/32
[58] Field of Search...... 260/239 B, 293.87, 326.85, 260/465.4, 465.5 R

[56] References Cited

UNITED STATES PATENTS

| | | | |
|---|---|---|---|
| 3,312,690 | 4/1967 | Masuda | 260/268 N |
| 3,470,182 | 9/1969 | Hardtmann | 260/268 N |
| 3,637,700 | 1/1972 | Gabel et al. | 260/256.5 R |
| 3,637,701 | 1/1972 | Gabel et al. | 260/256.4 Q |
| 3,642,793 | 2/1972 | Imashiro | 260/268 N |

*Primary Examiner*—G. Thomas Todd
*Attorney, Agent, or Firm*—Gerald D. Sharkin; Robert S. Honor

[57] ABSTRACT

Organic acid, halogenated organic acid and nitrate esters of N-(N-[cyanoalkyl]-N-nitroso)amino-aminoalcohols, e.g., 4-(N-[1-cyanoethyl]-N-nitroso)amino-1-piperazine-ethanol nitrate, are useful as anti-anginal agents.

5 Claims, No Drawings

N-(N-(CYANOALKYL)-N-NITROSO)AMINO-AMINOALCOHOL

This application is a divisional of copending application Ser. No. 153,883, filed June 16, 1971, now U.S. Pat. No. 3,766,185 which is a continuation-in-part of copending application Ser. No. 131,431 filed Apr. 5, 1971, now abandoned which is a continuation-in-part of copending applications Ser. Nos. 51,338, filed June 30, 1970, now abandoned and 67,994 filed Aug. 28, 1970, now abandoned.

This invention relates to organic acid, halogenated organic acid and nitrate esters of N-nitrosoaminoacetonitrile derivatives. More particularly, this invention concerns organic acid, halogenated organic acid and nitrate esters of N-(N-[cyanoalkyl]-N-nitroso)aminoaliphatic and cyclic aminoalcohols, their preparation and their use in pharmaceutical compositions.

The compounds of this invention may be represented by the following structural formula

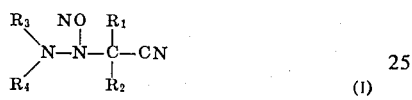

(I)

where
 $R_1$ and $R_2$ each independently represents hydrogen or lower alkyl, i.e., alkyl having 1 to 4 carbon atoms, e.g., methyl, ethyl, isopropyl and the like;
 $R_3$ represents — $(R_5)$ — $CH_2X$ and
 $R_4$ represents — $(R_6)$—$CH_3$ or —$(R_6)$—$CH_2X$
where
 X represents

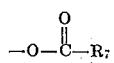

or -$ONO_2$;
 $R_5$ and $R_6$ each independently represents straight or branched chained alkylene having 1 to 7 carbon atoms, e.g., methylene, ethylene, t-butylene, and the like, and
 $R_7$ represents lower alkyl as defined above or lower alkyl as defined above substituted with 1 to 3 halo atoms having an atomic weight of from about 19 to 36 e.g., trifluoromethyl, trichloromethyl, $\alpha,\beta$-dichloroethyl and the like, or
$R_3$ and $R_4$ together with N represent

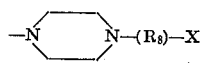

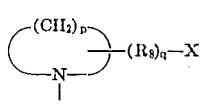

where
 p is 4,5 or 6;
 q is 0 or 1;
 X is as defined above; and $R_8$ is lower alkylene, i.e., alkylene having 1 to 3 carbon atoms, e.g., methylene, ethylene, isopropylene and the like,
provided that —$(R_8)_q$—X is not attached to a carbon atom adjacent to the nitrogen atom when q is 0.

The process for preparing the compounds of formula (I) may be represented by the following reaction scheme:

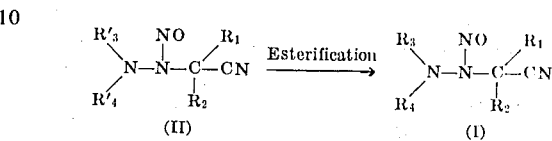

where
 $R_1$, $R_2$, $R_3$, and $R_4$ are as defined above;
 $R'_3$ is —$(R_5)$—$CH_2OH$ and
 $R'_4$ is —$(R_6)$—$CH_3$ or —$(R_6)$—$CH_2OH$
where
 $R_5$ and $R_6$ are as defined above, or
 $R'_3$ and $R'_4$ together with N represent

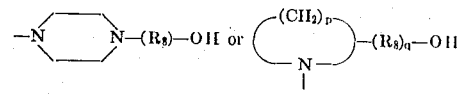

where
 p,q and $R_8$ are as defined above, and provided that —$(R_8)_q$—OH is not attached to a carbon atom adjacent to the nitrogen atom when $q = 0$.

The compounds of the formula (I) are prepared by esterifying the compounds of formula (II) with a nitrating or acylating agent. The esterification is carried out under non-acidic or weakly acidic conditions to prevent cyclization of the compounds (I) or (II) where $R_1$ or $R_2$ is hydrogen.

The nitration is carried out with conventional nitrating agents, preferably a mixture of nitric acid or metal nitrate and a carboxylic acid anhydride having 3 to 8 carbon atoms, especially acetic anhydride. It is preferred that the nitration be carried out at temperatures between about minus(—) 70°C. to 50°C., especially at about —15°C to 20°C. The reaction is also preferably carried out in excess reagent, especially excess carboxylic acid anhydride or a mixture of carboxylic acid anhydride and organic acid. If desired, inert organic solvents, in particular tetrahydrofuran, may be used. The nitrating agent, the temperature and the particular solvent used are not critical.

The acylation is carried out using conventional acylating agents of the formula

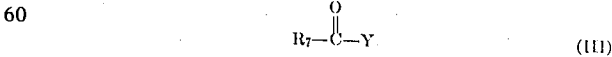

(III)

where
 Y represents halo having an atomic weight of from about 35 to 80 or

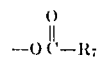

where
R₇ is as defined above and each R₇ of the compound of the formula

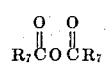

is the same. With non-halogenated organic acid anhydride acylating agents, no special precautions are necessary to maintain the reaction conditions non-acidic. However, when halogenated acid anhydride acylating agents or halogenated or unsubstituted acid halide acylating agents are used, a binding agent, e.g., pyridine, is used to maintain the required non-acidic conditions. The temperature at which the acylation is carried out is not critical, but it is preferred that it be run at temperatures between about −10°C. to about +30°C. Although a solvent is not required, it is preferred that the reaction be carried out in the presence of an inert non-acidic solvent, especially the halogenated lower alkanes such as methylene dichloride and the like. If desired, excess nonhalogenated acid anhydride can be employed as solvent when it is the acylating agent in the process.

The compounds of formula (I) are recovered by conventional techniques, e.g., evaporation. The compounds (I) in which $R_3$ and $R_4$ together with N form a piperazine ring may also be recovered in the form of their pharmaceutically acceptable weak organic acid addition salts such as the tartrate, maleate, citrate, succinate, acetate, benzoate, p-toluenesulfonate, benzenesulfonate and the like. The compounds of formula (I) in which R and $R_2$ are both lower alkyl and $R_3$, $R_4$, and N are a piperazine ring do not cyclize and consequently form pharmaceutically acceptable acid addition salts with stronger acids such as the hydrochloride, hydrobromide, sulfate, phosphate and the like. Both types of salts are readily prepared by reacting the free base with an appropriate acid in an inert solvent.

The compounds of formula (I) can also be prepared by the following reaction scheme

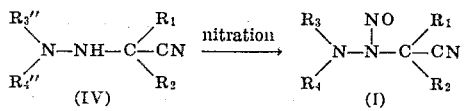

where
$R_3''$ represents $-(R_5)-CH_2-Z$;
$R_4''$ represents $-(R_6)-CH_3$ or, $-(R_6)-CH_2Z$ or $R_3''$ and $R_4''$ together with N represent

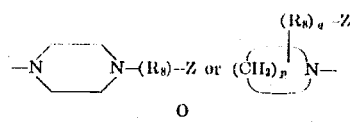

where
Z represents —OH or —OC—R₇ and
$R_1$, $R_2$, $R_3$, $R_4$, $R_5$, $R_6$, $R_7$, $R_8$, p, q and the proviso are as set out previously.

The nitration of the compounds of formula (IV) is carried out in the same manner as described above for the nitration of the compounds of formula (II). It will be appreciated that where either $R_3''$ or $R_4''$ or both are an organic acid ester, the $R_3$ and $R_4$ of the product will also be an organic acid ester. That is to say the nitration step nitrates $R_3''$ and $R_4''$ only when they contain a hydroxy group.

The compounds of formula (II) and (IV) in which both $R_1$ and $R_2$ are lower alkyl are novel and represent another aspect of this invention. Compounds (II) in which $R_1$ and $R_2$ are alkyl and compounds (IV) in which Z is OH are prepared in accordance with the following reaction scheme:

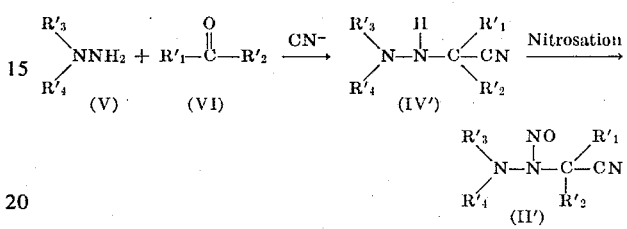

where
$R'_1$ and $R'_2$ each independently represent lower alkyl, as defined above and
$R'_3$, $R'_4$ and the proviso are as set out previously The compounds of formula (IV') are prepared by treating in acidic aqueous solvent the compounds of formula (V) with the ketones of formula (VI) in the presence of cyanide anion. The acid used to acidify the solvent can be any of the water soluble inorganic or organic acids, especially hydrochloric acid, sulfuric acid, and acetic acid. The cyanide anion is prepared in situ in the usual manner by reaction of an alkali metal cyanide with the acidic medium of the reaction. The preferred solvent is water; but mixtures of water and water miscible solvent, such as excess ketone (VI) or the lower alkanols, may be used if desired. Although the temperature of the reaction is not critical, it is conveniently carried out at temperatures of between −15° to +20° C., preferably between −10° to +15°C. The product (IV) is recovered by conventional techniques, e.g., extraction and evaporation.

The compounds of formula (II') are prepared by treating the compounds of formula (IV') with nitrous acid under the same condition as used in the preparation of the compound of formula (IV'). The nitrous acid is prepared in situ by the reaction of an alkali metal nitrite with the acid medium of the reaction. Although the solvent and temperature are not critical, the preferred conditions are the same as in the preparation of the compound of formula (IV'). The product (II') is recovered by conventional techniques e.g., extraction and evaporation.

The compounds of formula IV in which Z is

may be prepared according to the following reaction scheme:

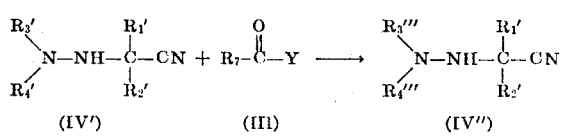

where $R_3'''$ represents

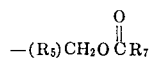

$R_4'''$ represents $-(R_6)-CH_3$ or

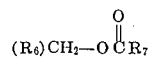

or $R_3'''$ and $R_4'''$ together with N represent

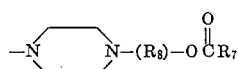

or

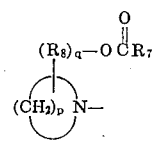

and $R_1'$, $R_2'$, $R_3'$, $R_4'$, $R_5$, $R_6$, $R_7$, $R_8$, $p,q$, and the proviso are as set out previously.

The process for preparing compound (IV'') is carried out under the same conditions as the acylation process for preparing compound (I) above.

The compounds of formula (VI) and many of the compounds of formulae (III) and (V) and of formulas (II) and (IV) in which one or both of $R_1$ and $R_2$ are hydrogen are known and may be prepared according to methods disclosed in the literature for known materials. The compounds of formulae (III) and (V) and (II) and (IV) wherein one or both of $R_1$ and $R_2$ are hydrogen which are not specifically disclosed in the art may be prepared by analogous methods from known materials.

As indicated previously, the compounds of formula (I) are useful because they possess pharmacological activity in animals. In particular, the compounds re useful as anti-anginal agents as indicated by an increase in coronary blood flow and by a reduction of myocardial oxygen consumption in an anesthetized dog given 0.5 to 10 milligrams per kilogram of body weight of a compound of formula (I) intravenously.

For such usage, compound (I) may be administered orally or parenterally, preferably sublingually, as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The composition for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin acacia, and libricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monoleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersisg or wetting agents and suspending agents identical or similar to those mentioned above. These pharmaceutical preparations may contain up to about 90% of the active ingredient in combination with the carrier or adjuvant.

The anti-anginal effective dose of active ingredient employed for the treatment of angina may vary depending on the particular compound employed and the severity of the condition being treated. However, in general, satisfactory results are obtained when the compounds (I) are administered at a daily dosage of from about 0.01 milligram to about 25 milligrams per kilogram of animal body weight, preferably given in divided doses two to four times a day, or in sustained release form. For most large mammals, such as primates, in need of said treatment, the total daily dosage is from about 0.7 to about 50 milligrams. Dosage forms suitable for internal use comprise from about 0.175 to about 25 milligrams of the active compound in intimate admixture with a solid or liquid pharmaceutically acceptable carrier or diluent.

The preferred pharmaceutical compositions from the standpoint of preparation and case of administration are solid compositions, particularly hardfilled capsules and tablets containing about 1 to 25 milligrams of active ingredient.

Tablets and capsules containing the ingredients indicated below may be prepared by conventional techniques and are useful in treating agina pectoris at a dose of one tablet or capsule 2 to 4 times a day.

| Ingredients | Weight (mg.) | |
| --- | --- | --- |
| | tablet | capsule |
| 4-[N-(1-cyanoethyl)-N-nitroso)amino-1-piperazine ethanol nitrate maleate | 10 | 10 |
| Tragacanth | 10 | — |
| Lactose | 237.5 | 290 |
| Corn starch | 25 | |
| Talcum | 15 | |
| Magnesium stearate | 2.5 | |

The following pharmaceutical compositions are formulated with the indicated amount of active agent using conventional techniques. The injectable suspension and the oral liquid suspension represent formulations useful as unit doses and may be administered in the treatment of angina pectoris. The injectable suspension is suitable for administration once a day where as the oral liquid suspension is suitable administered 2 to 4 times per day for this purpose:

| | | liquid suspension |
|---|---|---|
| 4-(N-[1-cyanoethyl]-N-nitroso)amino-1-piperazine ethanol nitrate maleate | 10 | 10 |
| Sodium carboxy methylcellulose U.S.P. | 1.25 | 12.5 |
| Methyl Cellulose | 0.4 | — |
| Polyvinylpyrrolidone | 5 | — |
| Lecithin | 3 | — |
| Benzyl alcohol | 0.01 | — |
| Magnesium aluminate silicate | — | 47.5 |
| Flavor | — | q.s. |
| Color | — | q.s. |
| Methyl paraben, U.S.P. | — | 4.5 |
| Propyl paraben, U.S.P. | — | 1.0 |
| Polysorbate 80 (e.g. Tween 80) U.S.P. | — | |
| Sorbitol solution 70% U.S.P. | — | 2,500 |
| Buffer agent to adjust pH for desired stability | q.s. | q.s. |
| Water | for injection q.s. to 1 ml. | q.s. to 5 ml. |

EXAMPLE 1

4-(N-[1-cyanoethyl]-N-nitroso)amino-1-piperazine-ethanol-nitrate

A solution of 6.42 g of 4-(N-[1-cyanoethyl]-N-nitroso)amino-1-piperazine ethanol in 2 ml of tetrahydrofuran is added over a period of 6 minutes dropwise to a stirred cooled (−10° to −5° C.) mixture of 11.9 ml of acetic anhydride and 3.95 ml of 90% nitric acid.

The resulting mixture is poured into ice water containing excess ammonia mixture. The crystalline product obtained is filtered off, washed with water and dried under vacuum. The solid is then triturated with ether after which the combined extracts are filtered and partially evaporated. Heptane is added to precipitate the final product, 4-(N-[1-cyanoethyl]-N-nitroso)amino-1-piperazine-ethanol-nitrate (mp 58°–60° C.).

When the above 4-(N-[1-cyanoethyl]-N-nitroso)amino-1-piperazine ethanol nitrate is treated with maleic acid in ether there is obtained 4-(N-[1-cyanoethyl]-N-nitroso)amino-1-piperazine ethanol nitrate maleate (m.p. 105° to 106° C).

When 1-(N-[1-cyanoethyl]-N-nitroso)amino-4-piperidinol, 1-(N-[1-cyanoethyl]-N-nitroso) amino-4-piperadin ethanol, N-(N-[1-cyanoethyl]-N-nitroso)amino -imidodiethanol or 2-(N-[N-cyanomethyl-N-nitroso]amino -N-ethylamino)ethanol is used in place of 4-(N-[1-cyanoethyl]-N-nitroso) amino-1-piperazine-ethanol in the above reaction, there is obtained the maleate salt of 1-(N-[1-cyanoethyl]-N-nitroso)amino-4-piperidinol nitrate; 1-(N-[1-cyanoethyl]-N-nitroso)amino-4-piperidin ethanol nitrate; N-(N-[1-cyanoethyl]-N-nitroso)amino-imidodiethanol dinitrate; or 2-(N-[N-cyanomethyl-N-nitroso]amino-N-ethylamino)ethanol nitrate, respectively.

EXAMPLE 2

4-(N-[2-cyanoisopropyl]-N-nitroso)amino-1-piperazine ethanol-nitrate a. 4-(N-[2-cyanoisopropyl]-N-nitroso)amino-1-piperazine ethanol To a solution of 5.8 g of 4-amino-1-piperazine-ethanol in 15 ml of water acidified with 3.8 ml of concentrated hydrochloric acid at a temperature of 5°C. is added 2.66 g of potassium cyanide in 10 ml of water. The mixture is stirred for 5 minutes and 2.5 gms of acetone are added after which the reactants are stored overnight in a refrigerator. After standing overnight, 6.6 ml of concentrated hydrochloric acid is added to this solution at about −10°C. followed dropwise by 3.5 g of sodium nitrate dissolved in 15 ml of water. After addition is complete, the reaction mixture is cooled to about 0°C. and neutralized with concentrated ammonium hydroxide. The product, 4-(N-[2-cyanoisopropyl]-N-nitroso)amino-1-piperazine ethanol, is extracted with chloroform and recovered by evaporation.

b. 4-(N-[2cyanoisopropyl]-N-nitroso)amino-1-piperazine ethanol nitrate

When the 4-(N-[2-cyanoisopropyl]-N-nitroso)amino-1-piperazine ethanol above is treated in accordance with the process of Example I, in place of 4-(N-[1-cyanoethyl]-N-nitroso)amino-1-piperazine ethanol, there is obtained 4-(N-[2-cyanoisopropyl]-N-nitroso)amino-1-piperazine ethanol nitrate. This product is treated with maleic acid in ether to yeild 4-(N-[2-cyanoisopropyl]-N-nitroso)amino-1-piperazine ethanol nitrate maleate (m.p. 124°C).

EXAMPLE 3

4-(N-[2-cyanoisopropyl]-N-nitroso)amino-1-piperazine ethanol-nitrate

To a solution of 5.8 g. of 4-amino-1-piperazine-ethanol in 15 ml. of water acidified with 3.8 ml of concentrated hydrochloric acid at a temperature of 5°C. is added 2.66 g. of potassium cyanide in 10 ml. of water. The mixture is stirred for 5 minutes and 2.5 gms of acetone are added after which the reactants are stored overnight in a refrigerator.

After evaporating off the solvent, the 4-(N-[2-cyanoisopropyl])amino-1-piperazine ethanol is dissolved in 2 ml. of acetic acid and added over a period of 6 minutes dropwise to a stirred cooled (−10° to −5° C.) mixture of 18 ml. of acetic anhydride and 6.00 ml. of 90% nitric acid.

The resulting mixture is poured into ice water containing an excess of ammonia solution. The crystalline product obtained is filtered off, washed with water and dried under vacuum. The solid is then triturated with ether after which the combined extracts are filtered and partially evaporated. Heptane is added to precipitate the final product, 4-(N-[2-cyanoisopropyl]-N-nitroso)amino-1-piperazine-ethanol-nitrate (mp. 58°–60°C.). The product is treated with maleic acid in ether to yield 4-(N-[2-cyanoisopropyl]-N-nitroso)amino-1-piperazine ethanol nitrate maleate.

When the above process is carried out using an equivalent amount of formaldehyde in place of the acetone, there is obtained 4-(N-cyanomethyl-N-nitroso)amino-1-piperazine ethanol nitrate.

EXAMPLE 4

4-(N-[1-cyanoethyl]-N-nitroso)amino-1-piperazine-ethanol acetate

To a solution of 1.0 g of 4-(N-[1-cyanoethyl]-N-nitroso)amino-1-piperazine ethanol in 10 ml. of methylene dichloride is added 0.5 g of acetic anhydride at 5°C.

The resulting mixture is added to 30 ml of methylene dichloride and the solution formed is washed with 10% sodium carbonate solution. The organic phase is dried; and evaporation yields the final product, 4-(N-[1-cyanoethyl]-N-nitroso)amino-1-piperazine-ethanol acetate as a pale yellow oil. When the product is treated with maleic acid in ether, there is obtained 4-(N-[1-cyanoethyl]-N-nitroso)amino-1-piperazine ethanol acetate maleate.

When 1-(N-[1-cyanoethyl]-N-nitroso)amino-4-piperidinol, 1-(N[1-cyanoethyl]-N-nitroso)amino-4-piperidine ethanol, N-(N-[1-cyanoethyl]-N-nitroso)amino-imido diethanol or 2-(N-[N-cyanomethyl-N-nitroso]-amino-N-butyl amino)ehtanol is used in place of 4-(N-[1-cyanoethyl]-N-nitroso)-amino-1-piperazine ethanol in the above reaction, there is obtained 1-(N-[1-cyanoethyl]-N-nitroso)amino-4-piperidinol acetate; 1-(N-[1-cyanoethyl]-N-nitroso)amino-4-piperidine ethanol acetate, N-(N-[1-cyanoethyl]-N-nitroso)amino-imido diethanol diacetate; or 2-(N-[N-cyanomethyl-N-nitroso]amino-N-butyl amino)ethanol acetate, respectively.

Following the procedure of this example for preparing 4-(N-[1-cyanoethyl]-N-nitroso)amino-1-piperazine ethanol acetate but using an equivalent amount of trifluoro acetic anhydride in place of acetic anhydride used therein and adding an excess of pyridine to bind the acid liberated in the reaction, there is obtained 4-(N-[1-cyanoethyl]-N-nitroso)amino-1-piperazine ethanol trifluoro acetate.

EXAMPLE 5

4-(N-[2-cyanoisopropyl]-N-nitroso)amino-1-piperazine ethanol-acetate a.  4-(N-[2-cyanoisopropyl]-N-nitroso)amino-1-piperazine ethanol To a solution of 5.8 g. of 4-amino-1-piperazine-ethanol in 15 ml. of water acidified with 3.8 ml of concentrated hydrochloric acid at a temperature of 5°C. is added 2.66 g of potassium cyanide in 10 ml. of water. The mixture is stirred for 5 minutes and 2.5 gms of acetone are added after which the reactants are stored overnight in a refrigerator. After standing overnight, 6.6 ml. of concentrated hydrochloric acid is added to this solution at about −10°C. followed dropwise by 3.5 g of sodium nitrate dissolved in 15 ml. of water. After addition is complete, the reaction mixture is cooled to about 0°C. and neutralized with concentrated ammonium hydroxide. The product, 4-(N-[2-cyanoisopropyl]-N-nitroso)amino-1-piperazine ethanol, is extracted with chloroform and recovered by evaporation.

b.  4-(N-[2-cyanoisopropyl]-N-nitroso)amino-1-piperazine ethanol acetate

When the 4-(N-[2-cyanoisopropyl]-N-nitroso)amino-1-piperazine ethanol is treated with acetic anhydride in accordance with the process of Example 4, in place of 4-(N-[1-cyanoethyl]-N-nitroso)amino-1-piperazine ethanol, there is obtained 4-(N-[2-cyanoisopropyl]-N-nitroso)amino-1-piperazine ethanol acetate. This product is treated with maleic acidin ether to yeild 4-(N-[2-cyanoisopropyl]-N-nitroso)amino-1-piperazine ethanol acetate maleate (m.p. 134°–136°C.)

EXAMPLE 6

4-(N-[2-cyanoisopropyl]-N-nitroso)-1-piperazine ethanol acetate

When the 4-(N-[2-cyanoisopropyl]) amino -1-piperazine ethanol of example 3 is treated with acetic anhydride in accordance with the process of example 4, there is obtained 4-(N-[2-cyanoisopropyl])amino-1-piperazine ethanol acetate which when treated with additional acetic anhydride and nitric acid in accordance with the process of example 1, yields 4-(N-[2-cyanoisopropyl]-N-nitroso)amino-1-piperazine-ethanol acetate.

What is claimed is:

1. A compound of the formula

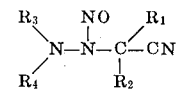

where
$R_1$ and $R_2$ each independently represents hydrogen or lower alkyl;
$R_3$ represents $-(R_5)-CH_2-X$;
$R_4$ represents $-(R_6)-CH_3$ or $-(R_6)-CH_2X$;
where
X represents

or $-ONO_2$;
$R_5$ and $R_6$ each independently represents straight or branched chain alkylene having 1 to 7 carbon atoms and
$R_7$ represents lower alkyl or lower alkyl substituted with 1 to 3 halo atoms having an atomic weight between about 19 to 36, or
$R_3$ and $R_4$ together with N represent

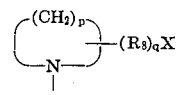

where
p is 4,5 or 6;
q is 0 or 1,
$R_8$ is lower alkylene, and X is as defined above, provided that $-(R_8)_q-X$ is not attached to a carbon adjacent to the nitrogen atom when $q$ is 0.

2. The compound of claim 1 which is 1-(N-[1-cyanoethyl]-N-nitroso)amino-4-piperidine ethanol acetate.

3. The compounds of claim 1 in which $R_3$ and $R_4$ together with N represent
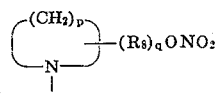
where
p is 4, 5 or 6;
q is 0 or 1 and
$R_8$ is lower alkylene,
provided that $-(R_8)ONO_2$ is not attached to a carbon adjacent to the nitrogen atom when q is 0.
4. The compound of claim 3 which is 1-(N-[1-cyanoethyl]-N-nitroso)amino-4-piperidin-ethanol nitrate.
5. The compound of claim 3 in the form of their maleate salts.
* * * * *